US012633488B2

(12) United States Patent
Jud et al.

(10) Patent No.: US 12,633,488 B2
(45) Date of Patent: May 19, 2026

(54) ELECTRON EMITTER FOR MULTIPLE FOCAL SPOT SIZES

(71) Applicant: Siemens Healthineers AG, Forchheim (DE)

(72) Inventors: Christoph Jud, Nuremberg (DE); Anja Fritzler, Erlangen (DE); Peter Geithner, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 125 days.

(21) Appl. No.: 18/743,180

(22) Filed: Jun. 14, 2024

(65) Prior Publication Data

US 2024/0420912 A1 Dec. 19, 2024

(30) Foreign Application Priority Data

Jun. 16, 2023 (DE) ..................... 10 2023 205 644.5

(51) Int. Cl.
*H01J 35/06* (2006.01)
*H01J 35/14* (2006.01)

(52) U.S. Cl.
CPC .......... *H01J 35/064* (2019.05); *H01J 35/153* (2019.05)

(58) Field of Classification Search
CPC ......... A61B 6/022; A61B 6/4077; A61B 6/54; H01J 2235/062; H01J 2235/068; H01J 35/064; H01J 35/24; H01G 1/52
See application file for complete search history.

(56) References Cited

U.S. PATENT DOCUMENTS

| | | | | |
|---|---|---|---|---|
| 5,086,442 | A | 2/1992 | Gemmel et al. | |
| 6,084,942 | A | 7/2000 | Hell et al. | |
| 11,901,152 | B2 * | 2/2024 | Geithner | H01J 35/065 |
| 2003/0025429 | A1 | 2/2003 | Hell et al. | |
| 2021/0383997 | A1 | 12/2021 | Fritzler | |
| 2022/0359148 | A1 | 11/2022 | Jud et al. | |

FOREIGN PATENT DOCUMENTS

| | | | |
|---|---|---|---|
| DE | 4108591 | A1 | 10/1991 |
| DE | 19741750 | A1 | 3/1999 |
| DE | 10135995 | A1 | 2/2003 |
| DE | 102020206939 | B4 | 12/2021 |
| DE | 102021204540 | B3 | 9/2022 |

* cited by examiner

*Primary Examiner* — Don K Wong
(74) *Attorney, Agent, or Firm* — Harness, Dickey & Pierce, P.L.C.

(57) ABSTRACT

An electron emitter according to one or more example embodiments for a rotary piston X-ray tube has a segmented emitter surface including at least two emitter elements which can be activated independently of each other and is set up to activate at least one subset of the segments of the segmented emitter surface as an activated emission surface for emitting electrons from the activated emission surface, wherein the at least two emitter elements are arranged in such a way that the segmented emitter surface is axially symmetrical in an emitter surface place, at least one emitter element of the at least two emitter elements is embodied for the thermionic emission of electrons, and the at least two emitter elements are arranged such that a distance between the respective emitter surfaces is minimal.

18 Claims, 10 Drawing Sheets

ELECTRON EMITTER FOR MULTIPLE FOCAL SPOT SIZES

CROSS-REFERENCE TO RELATED APPLICATION(S)

The present application claims priority under 35 U.S.C. § 119 to German Patent Application No. 10 2023 205 644.5, filed Jun. 16, 2023, the entire contents of which is incorporated herein by reference.

FIELD

One or more example embodiments relates to an electron emitter, a rotary piston X-ray tube and a rotary piston X-ray emitter.

RELATED ART

A conventional rotary piston X-ray emitter typically comprises a housing and a rotary piston X-ray tube, which is mounted within the housing in a rotatable manner relative to the housing. For example, an X-ray emitter of this type with a forcibly cooled rotary anode, with a rotary piston tube, the vacuum shell of which rotates within the emitter housing filled with a liquid coolant, is known from DE 19 741 750 A1.

With a conventional rotary piston X-ray emitter, the entire rotary piston X-ray tube typically rotates, in particular the evacuated rotary piston together with the anode. With some rotary piston X-ray emitters, a cathode with an electron emitter is likewise connected to the rotary piston in a torque-proof manner so that the cathode, anode and rotary piston have the same rotational frequency. Other rotary piston X-ray emitters have a cathode with an electron emitter, which are stationary and are therefore not distorted together with the anode and the rotary piston, as described by way of example in DE 4 108 591 A1. In contrast, with a conventional rotary anode X-ray tube, only the rotary anode rotates relative to the evacuated tube housing.

Another difference between a conventional rotary anode X-ray tube and a conventional rotary piston X-ray tube relates to a placement of the electron emitter. With the conventional rotary anode X-ray tube, the electron emitter, which is stationary in contrast to the anode, is usually placed eccentrically outside the axis of rotation directly above a circular ring-shaped focal path of the anode. The focal path is created in particular by the fact that the electrons arriving in a focal spot interact with the anode on account of the rotation of the anode on a circular ring-shaped path. An electron emitter of such a rotary anode X-ray tube can have up to three different emitter elements, for example, the emitted electrons of which can be focused geometrically on different focal spot sizes. This focusing is carried out in particular via a deflection unit, which generates an electric or electromagnetic field for this purpose.

With the conventional rotary piston X-ray tube, the electron emitter typically lies on the axis of rotation centrally above the anode. In order to keep the focal spot stationary relative to the housing, the emitted electrons are deflected from the axis of rotation to an edge area of the anode, generally by an electromagnetic field. To this end, the deflection unit has in particular a first quadrupole magnet, which is set up to adjust the ratio of length and width of the focal spot. If the deflection unit has a second quadrupole magnet, this can typically be used to adjust the size of the focal spot.

SUMMARY

An embodiment of a rotary piston X-ray emitter with at least one quadrupole magnet is comparatively complex and cost-intensive.

Furthermore, it is known to deflect the emitted electrons with a correspondingly high frequency in such a way that they jump back and forth on the anode, as a result of which the focal spot can be effectively enlarged. Alternatively or in addition, it is possible to deform the focal spot via a variable grid voltage which applies between the electron emitter and a focusing cylinder.

One or more example embodiments provides an electron emitter, a rotary piston X-ray tube and a rotary piston X-ray emitter with a simpler and thus more cost-effective design.

This is achieved by the features of the independent claims. Advantageous embodiments are described in the subclaims.

In the following, one or more example embodiments is described and explained in more detail on the basis of the exemplary embodiments shown in the figures. In principle, in the following description of the figures, essentially unchanged structures and units are named with the same reference sign as when the respective structure or unit first appeared.

DETAILED DESCRIPTION

Figure 1:
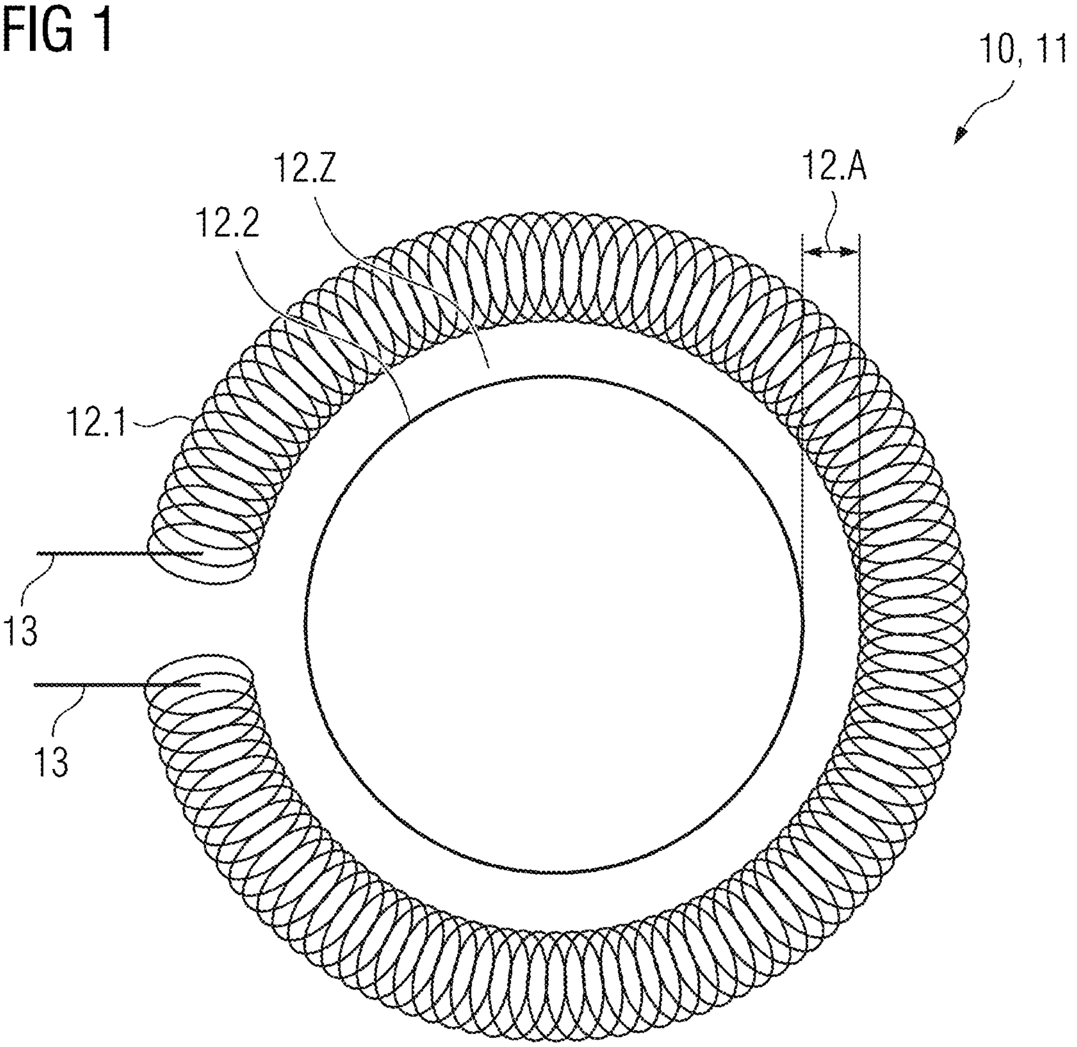
FIG. 1 shows an electron emitter in a first embodiment.

Independent of the grammatical term usage, individuals with male, female or other gender identities are included within the term.

The electron emitter according to one or more example embodiments for a rotary piston X-ray tube has

- a segmented emitter surface, wherein the segmented emitter surface has at least two emitter elements which can be activated independently of each other and is set up to activate at least one subset of the segments of the segmented emitter surface as an activated emission surface for the emission of electrons from the activated emission surface, wherein the at least two emitter elements are arranged in such a way that the segmented emitter surface in the emitter surface plane is embodied to be axially symmetrical, wherein at least one emitter element of the at least two emitter elements is embodied for the thermionic emission of electrons, characterized in that the at least two emitter elements are arranged close to each other so that a distance between the respective emitter surfaces is minimal.

By arranging several emitter elements as close as possible to each other, a size of the focal spot, which depends on an extent of the activated emission surface, can advantageously be varied at low cost. In this case, a deflection unit, which regularly requires a comparatively more expensive quadrupole magnet, can preferably be designed in a less complex, in particular without a quadrupole magnet, and thus more cost-effective manner. One or more example embodiments enables a further advantage by it essentially being possible to use field-effect in combination with thermionic emitter elements or thermionic elements exclusively. Due to their cost advantages, the use of emitter elements for thermionic emission is particularly advantageous.

The electron emitter is suited in particular to medical imaging. Alternatively or in addition, the electron emitter may be suited to materials testing.

The emitter surface of the electron emitter usually has at least as many segments as the emitter elements are part of the electron emitter. The electron emitter therefore typically has at least two segments.

Usually, one segment corresponds to one emitter surface each. It is conceivable that, depending on the embodiment of the emitter element and/or the emitter surface, an emitter surface comprises more than one segment. In this case, for example, the emitter surface can be divided into subareas which can be activated independently of each other. In principle it is therefore conceivable that an electron emitter with two electron emitters has an emitter surface with more than two segments.

An activatable emitter element is designed in particular in such a way that the electron emission can be switched on or off by the activated emission surface of this emitter element. In the latter case, this means that the emitter element does not have an activated emission surface, but a deactivated emission surface. The activation or deactivation of the emission surface can be carried out in a clocked manner and/or several times as a function of an emitter switching signal. The emitter switching signal can be provided in particular by a control unit. The emitter switching signal may comprise, for example, a switching-on or off a thermionic heating current device upstream of the emitter element, a switching-on or off of a high voltage on a grid downstream of the emitter element and/or a switching-on or off of a gate voltage of the emitter element.

The setup of the segmented emitter surface for the activation of at least the subset of segments means in particular that the segmented emitter surface can become or can be at least partially activated as a function of the emitter switching signal, for example. By way of example, the emitter switching signal may contain an indication of the segments to be activated or of the activated segments which form the subset and/or activate these segments directly on account of electrical and/or physical circuitry.

If an emitter element has more than one segment, the activated emission surface of this emitter element can comprise only activated segments. Alternatively, it is conceivable that the activated emission surface comprises at least one segment which is deactivated.

The axial symmetry in the emitter surface plane means in particular that the electron emitter comprises at least one axis of symmetry. Depending on the embodiment of the electron emitter, the axis of symmetry can lie within an emitter element or several emitter elements. Alternatively or in addition, the axis of symmetry can lie between two adjacent emitter elements.

The emission of electrons can typically be differentiated according to the physical effects underlying the emission. With thermionic emission, a direct or indirect heating of the electron emitter takes place in particular, which emits the electrons after reaching a minimum temperature. With direct heating, the electron emitter itself is heated in particular via a heating current, which is provided, for example, by the heating current device. With indirect heating, a further, thermionic or non-thermionic emitter element is arranged upstream of the thermionic emitter element and heats the thermionic emitter element with electrons emitted into a vacuum, in which the free electrons are accelerated by the upstream electron emitter toward the thermionic emitter. In this case, the heating current device is typically connected to the upstream electron emitter in order to provide the heating current.

The field-effect emission is carried out in particular by applying a gate voltage in relation to a carrier of the emitter element, on which a plurality of field-effect emitter needles are arranged. Due to the applied gate voltage, electrons escape especially at the tip of the field-effect emitter needles. The field-effect emitter needles usually feature carbon, silicon and/or molybdenum.

In particular, with a field-effect emitter element and/or with an indirectly heated thermionic emitter element, the emitter surface of such an emitter element may have several segments. The activation of only one part, i.e. not all segments, of such an emitter element can be achieved, for example, by only one part of the emitter needles being excited to field effect emission or only a certain area of the indirectly heated electron emitter being heated with the free electrons.

The emitter elements are preferably arranged as close as possible to each other. The distance between the respective emitter surfaces is advantageously so small that the emitter surfaces virtually merge into each other. Typically, there is galvanic isolation between the emitter surfaces in any case. In particular, the at least two emitter elements are arranged so close to each other that if electrons are emitted at the same time, the emitted electrons can be directly superimposed and/or cannot be distinguished. The emitter surfaces of the emitter elements are typically arranged and aligned in such a way that the segmented emitter surface lies in a plane and/or is flat.

The electron emitter can assume different operating states, especially over time. It is conceivable that the operating states are set up in such a way that the respective emitter elements are not operated alternately. In other words, the activated emission surface does not change from one electron emitter to another electron emitter over time. The activated emission surface is usually only varied in its extent when an emitter element is additionally activated or deactivated. In one example with a total of two electron emitters, this means that a total of four operating states are theoretically typically conceivable, i.e. no emitter elements are active, one emitter element is active and both emitter elements are active. Preferably, the electron emitter according to one or more example embodiments is limited to three operating states, namely, no emitter elements are active, one emitter element is active, and both emitter elements are active.

One embodiment provides that the segmented emitter surface consists of the two emitter elements and is essentially rotationally symmetrical, wherein the first emitter element is embodied in a ring-shaped manner with a central opening and wherein the second emitter element is arranged in the central opening within the first emitter element. This embodiment is particularly advantageous because the first emitter element enables a rotationally symmetrical electron emitter due to its ring shape, which is particularly advantageous for a rotary piston X-ray tube. This embodiment advantageously allows two different extents on the activated emission surface and thus two focal spot sizes. Essentially rotationally symmetrical means that apart from the usual two feeds to the first emitter element, which may be necessary to heat and/or hold the electron emitter, the first emitter element describes a complete ring and/or circle. The emitter surface of the first emitter element and the emitter surface of the second emitter element are typically located in the emitter surface plane. The first emitter element is bent in particular around the central opening. In particular, the central opening allows the second emitter element to be arranged therein.

In particular, the first emitter element can be a spiral emitter and thus be embodied for thermionic emission of electrons. Alternatively or in addition, the second emitter element can be embodied for thermionic emission, for example as a spiral emitter or flat emitter. The second emitter element can alternatively be designed as a field-effect emitter element. This embodiment offers in particular the advantage that the spiral emitter can be embodied particularly simply in a ring-shaped manner.

One embodiment provides that the segmented emitter surface consists of the two emitter elements, is embodied as axially symmetrical and rectangular with respect to two spatial axes that are perpendicular to each other, and that the segmented emitter surface is higher than it is wide. The electron emitter thus has a total of two emitter elements that can be activated independently of each other. The respective emitter surfaces of the two electron emitters can be rectangular, in particular square. In this embodiment, the electron emitter comprises in particular two axes of symmetry, which are perpendicular to each other. One of the two axes of symmetry lies in particular on a dividing line between the two emitter elements, where the width of the dividing line is predetermined by the distance between the two emitter elements. The other of the two axes of symmetry runs in particular through the middle of both emitter elements. The segmented emitter surface is in particular not square. In other words, the extent of the emitter surface is higher than wide or wider than high, depending on the perspective on the emitter surface. This embodiment allows for an electron emitter with somewhat asymmetrically installed emitter elements and two focal spot sizes.

In particular, the first emitter element can be a spiral emitter and the second emitter element can be a spiral emitter. This embodiment enables a comparatively cost-effective electron emitter.

One embodiment provides that the segmented emitter surface consists of three emitter elements arranged next to each other on a straight line and is higher than it is wide, and wherein an emitter surface of one of the emitter elements is larger than the emitter surfaces of the other two emitter elements combined. The straight line can correspond in particular to an axis of symmetry. In particular, the emitter elements are arranged in a row on the straight line.

Preferably, the distance between two adjacent emitter elements is minimal. The segmented emitter surface is in particular rectangular, not square and/or wider than it is high. The comparatively large emitter surface is typically arranged between the two small emitter surfaces. In one operating state, for example, all three emitter elements can be operated and in another operating state, for example, only the one with the comparatively large emitter surface.

In particular, each emitter element can be a spiral emitter and/or a flat emitter. Alternatively, the central emitter element can be a spiral emitter and/or a flat emitter and the emitter elements adjacent to the central emitter element can be non-spiral-shaped wire emitters. A non-spiral-shaped wire emitter is in particular a type of thermionic emitter, which consists of a single wire. In particular, the wire emitter can be straight. If the wire emitter is curved, then a number of turns is usually less than 2, preferably less than 1. The spiral emitter has a number of turns of at least 2.

One embodiment provides that two adjacent emitter elements are oriented to each other in such a way that the emitter length directions are perpendicular to each other. With a spiral emitter, the emitter length direction is defined in particular as the direction in which the turns are lined up one after the other. With a wire emitter, the emitter length direction is defined as the direction of the longest extent of the wire.

The rotary piston X-ray tube according to one or more example embodiments has

- a cathode,
- an evacuated rotary piston that can be mounted around the axis of rotation with the rotational frequency relative to a fixed bearing part, and
- an anode, wherein the cathode and the anode are connected to the rotary piston in a torque-proof manner, wherein the cathode has a cathode head and an electron emitter, which is inserted into the cathode head in a torque-proof manner, characterized in that the rotary piston consists of a glass in a section between the anode and the cathode.

In a glass version, the rotary piston offers, among other things, advantages that result directly from an external shape of the rotary piston and thus the rotary piston X-ray tube. The rotary piston X-ray tube according to one or more example embodiments is particularly suitable as a comparatively cost-effective design.

Another advantage of the rotary piston is that glass is insulating and thus an optional deflection unit can be positioned closer to the glass piston. The insulating property of glass is particularly advantageous because no other material, such as typically ceramics, has to be used for electrical insulation.

In a glass version, the rotary piston according to one or more example embodiments can be described in particular as a glass piston. The glass piston advantageously enables a relatively compact design, which does not require a mid-section compared to conventional rotary piston X-ray emitters. A minimum length of the rotary piston is therefore predetermined in particular by the necessary insulation length between anode and cathode. A deflection of the emitted electrons via a deflection unit can therefore preferably take place directly from the cathode, while in a conventional rotary piston X-ray emitter the deflection only takes place after the waist.

Cooling of the anode in the rotary piston X-ray tube involves direct cooling, whereby heat can be dissipated from the anode directly into the cooling medium flowing around the rotary piston, for example oil. Thus, it is advantageous to dispense with intermediate storage of the heat in an intermediate heat storage tank, which is thermally coupled to the anode and regularly consists of graphite. Thus, a maximum thermal load of the anode relative to the size of the anode and the heat capacity related to the size is therefore preferably comparatively very large.

The rotary piston X-ray tubes, in particular the rotary piston, are typically vacuum-capable. The rotary piston is advantageously hermetically sealed. In particular, the evacuated rotary piston comprise a high vacuum.

The rotary piston can be stored or supported around the axis of rotation via a bearing means. The rotary piston can rotate around the axis of rotation in particular with the rotational frequency. In particular, the fixed bearing part can be part of a bearing unit. In particular, the fixed bearing part is part of a rotary piston X-ray emitter and not part of the rotary piston X-ray tube. In principle, it is conceivable that the bearing unit as a whole and thus the fixed bearing part are part of the rotary piston X-ray tube.

Alternatively, the cathode head can have the bearing means in particular, wherein the cathode head can be mounted around the axis of rotation via the bearing means. The cathode head can be mounted in particular with respect to the fixed bearing part. The fixed bearing part and optionally the bearing means can be part of the bearing unit. In particular, the bearing unit can be a rotary bearing and/or part of the cathode, or part of the rotary piston X-ray tube, or part of the rotary piston X-ray emitter. The bearing means can be, for example, a rotor and/or rotating bearing part. The fixed bearing part can be in particular a stator. The rotary bearing can be in particular a ball bearing or an in particular liquid metal, floating bearing.

The bearing unit enables in particular the cathode head or the electron emitter or the rotary piston to rotate with the rotational frequency. For example, the rotational frequency is at least 5 Hz, in particular 50 Hz, preferably 200 Hz.

The cathode and the anode are usually arranged on opposite sides within the rotary piston. The high vacuum is in particular between the cathode and the anode. The torque-proof connection of the cathode and the anode to the rotary piston is made, for example, via a fastening means. In particular, the fastening means can be a solder point and/or welding point. The torque-proof connection of the cathode and the anode to the rotary piston can be made alternatively or additionally via parts of the bearing unit, so that the cathode and the anode are not directly coupled with the rotary piston. The anode and the cathode and the electron emitter and the rotary piston rotate in particular together around the axis of rotation with the same rotational frequency.

The section between the anode and the cathode, which consists of the glass, is in particular ring-shaped and/or rotationally symmetrical to the axis of rotation. The glass section extends across at least half of the distance between the cathode and the anode, in particular in the longitudinal direction of the rotary piston. The glass section can extend in the longitudinal direction of the rotary piston to the height of the cathode or beyond. Alternatively or in addition, the glass section can extend in the longitudinal direction the rotary piston to the height in front of the focal path on the anode or behind the focal path on the anode. In the latter case, the glass section serves in particular as an X-ray exit window. The focal path comprises in particular those focal spots in which the emitted electrons strike the anode and form the ring-shaped focal path due to the rotation.

The cathode head typically has a round outer shape and can be designed as a focus head. The outer shape of the cathode head can alternatively be oval or angular.

The fact that the cathode head can be mounted applies in particular similarly to the electron emitter. In other words, the bearing means can be part of the electron emitter, via which the electron emitter can be mounted so as to be rotatable around the axis of rotation with the rotational frequency relative to the fixed bearing part. In particular, the fact that the electron emitter is inserted into the cathode head in a torque-proof manner means that a bearing of the cathode head is similar to a bearing of the electron emitter and vice versa.

The electron emitter is suited in particular to medical imaging. Alternatively or in addition, the electron emitter may be suited to a materials testing.

The electron emitter is typically firmly connected to the cathode head and thus to the rotary piston. The torque-proof insertion comprises in particular a torque-proof fastening. The electron emitter can be inserted into the cathode head in particular via a fastening means. The fastening means can be a screw and/or a solder point and/or a weld point.

One embodiment provides that the rotary piston is cylindrical in shape and that a first end face of the cylindrical rotary piston is embodied to receive a cathode-side bearing part and a second end face of the cylindrical rotary piston is designed to receive an anode-side bearing part, wherein the cathode is fastened to the cathode-side bearing part and the anode is fastened to the anode-side bearing part, and wherein the cathode-side bearing part and the anode-side bearing part are embodied for the rotation of the rotary piston relative to the fixed bearing part around the axis of rotation. The cylindrical shape advantageously allows for a compact rotary piston X-ray tube. The first end face and the second end face close off the cylindrical rotary piston on the opposite sides along the axis of rotation. The central axis of the cylinder corresponds in particular to the axis of rotation. The cathode-side bearing part can be connected in a vacuum-tight manner to the rotary piston, in particular at the first end face. The anode-side bearing part can be connected in a vacuum-tight manner to the rotary piston, in particular at the second end face. The cathode-side bearing part and/or the anode-side bearing part are typically part of the bearing unit, in particular the rotating bearing part and/or the rotor. The cathode-side bearing part and/or the anode-side bearing part can interact in particular with the fixed bearing part for the rotation of the rotary piston.

One embodiment provides that the rotary piston is cylindrical in shape and the entire lateral surface of the rotary piston consists of the glass. In this case, the rotary piston can consist essentially of the lateral surface and/or exclusively of the glass. This embodiment is particularly advantageous with the previous embodiment.

One embodiment provides that the rotary piston X-ray tube is a bipolar high-voltage tube, wherein a negative high-voltage potential prevails at the cathode and a positive high-voltage potential prevails at the anode. In particular, the difference between the positive high-voltage potential and the negative high-voltage potential indicates an in particular acceleration voltage according to which the electrons can be accelerated from the cathode toward the anode. Alternatively, it is conceivable that the cathode or the anode are on ground potential and only one of the two electrodes is on high voltage potential.

One embodiment provides that a diameter of the rotary piston perpendicular to the axis of rotation is less than 100 mm, preferably 85 mm or 65 mm. In this exemplary embodiment, the central axis of the rotary piston corresponds in particular to the axis of rotation. The rotary piston is rotationally symmetrical, in particular with regard to the axis of rotation. This design is advantageous due to its compactness.

One embodiment provides that a length of the rotary piston along the axis of rotation is less than 200 mm. In this exemplary embodiment, the central axis of the rotary piston corresponds in particular to the axis of rotation. The rotary piston is rotationally symmetrical, in particular with regard to the axis of rotation. As a result, the design of the rotary piston x-ray tube can advantageously be smaller.

One embodiment provides that the rotary piston can be rotated around the axis of rotation via a ball bearing. In this case, the bearing unit is the rotary bearing which is embodied as a ball bearing. The bearing unit can be mounted in oil or in vacuum. The bearing means can be in particular the balls of the ball bearing.

The inventive rotary piston x-ray emitter has a housing, a rotary piston X-ray tube and a deflection unit, wherein the rotary piston X-ray tube is mounted rotatably within the housing around an axis of rotation with a rotational frequency relative to the housing, wherein the rotary piston X-ray tube has a cathode, a rotary piston and an anode, wherein the anode inside the rotary piston is connected to the rotary piston in a torque-proof manner, wherein the cathode has a cathode head and an electron emitter inserted into the cathode head for the emission of electrons and is arranged within the rotary piston on the axis of rotation, characterized in that the deflection unit is set up to generate an inhomogeneous field between the cathode and the anode within the rotary piston, wherein the inhomogeneous field influences the emitted electrons on their different paths in the direction of the anode and is designed in such a way that differences in the path length of the emitted electrons along the different paths within the inhomogeneous field are taken into account.

The rotary piston X-ray emitter is particularly advantageous because the use of the deflection unit to generate the inhomogeneous field makes the design of the rotary piston X-ray emitter much less complex and therefore more cost-effective. The rotary piston X-ray emitter preferably does not comprises a separate dipole/quadrupole magnet or any other additional higher-pole magnet. According to one or more example embodiments, an inhomogeneous field is generated in order to deflect the electrons and at the same time focus them in a suitable manner, without the use of a dipole/quadrupole magnet or any other additional higher-pole magnet. Since the inhomogeneous field takes into account the differences in the path length of the emitted electrons, the need for complex deflection is preferably eliminated. Advantageously, the deflection unit enables uniform occupancy in the electric focal spot, which is preferably accompanied by a homogeneous temperature distribution.

The housing typically completely encloses the rotary piston X-ray tube and the deflection unit and/or is closed. The housing may have a cooling medium to cool the rotary piston X-ray tube and/or the deflection unit. The cooling medium can be liquid and/or gaseous. The cooling medium is in particular air and/or an oil. The housing may have a cooling apparatus through which the cooling medium is tempered and/or exchanged and/or circulated. The cooling apparatus may have a heat exchanger and/or a cooling medium feed and cooling medium discharge. On an outside of the housing, for example, a surface area of the housing may be enlarged by cooling fins.

The deflection unit generates the inhomogeneous field in particular in a way that conventionally requires a quadrupole magnet. According to one or more example embodiments, the deflection unit is simplified with a quadrupole magnet compared to a conventional rotary piston X-ray emitter, as a result of which the deflection unit can be optimally adjusted for comparatively fewer operating points. On the other hand, the deflection unit according to one or more example embodiments is thus technically less complex, does not require complex control and is therefore more cost-effective.

The deflection unit preferably generates the inhomogeneous field in such a way that the electrons can be fanned out and/or deflected in the radial direction, in particular taking into account the differences in path length. The fanning out in the radial direction advantageously increases the length of the electric focal spot. In particular, the deflection in the radial direction enables the electrons to reach the predetermined focal path. A further advantage of radial deflection is that the width of the focal spot can be reduced, particularly if the activated emission surface of the electron emitter is wider than the desired optical width.

In particular, the deflection unit generates a field whose field strength depends on the location. The deflection unit generates such an inhomogeneous field in particular in a volume section of the rotary piston that lies between the electron emitter and the anode. In particular, the volume section lies between the activated emission surface and a focal path on the anode. It is conceivable that the volume section does not lie on a direct line of sight between the activated emission surface and the focal path, in particular due to the forces acting on the electrons resulting from the generated inhomogeneous field. In particular, the deflection unit is arranged and aligned in such a way that forces resulting from the generated inhomogeneous field act on a large part of the emitted electrons. The deflection and/or fanning out of the electrons in the radial direction is largely carried out in particular via location-dependent forces.

The fact that the deflection unit generates an inhomogeneous field can comprise that a homogeneous field is generated by the deflection unit in another volume section. In principle, it is conceivable that in the volume section with the inhomogeneous field, the field strength does not depend on the location to a small extent. This part is advantageously outside the trajectory of the electrons and/or acts on less than 50%, preferably less than 20%, of the emitted electrons. In particular, the deflection unit is aligned with the paths of the electrons in such a way that a large part, advantageously at least 80%, of the electrons are influenced by the inhomogeneous field. In particular, the deflection unit is aligned with the paths of the electrons in such a way that a large part, advantageously at least 80%, of the electrons are influenced by the inhomogeneous field.

In particular, the deflection unit generates an inhomogeneous field, which is static for an emission period. The inhomogeneous field is unchangeable, especially within the emission period. In particular, the emission period includes at least one pulse duration of an X-ray pulse.

The influence of the emitted electrons on their different paths means in particular that the inhomogeneous field exerts forces on the emitted electrons, which can lead to a deflection of at least one electron. Since the electron emitter is typically not a point-shaped electron source, but emits electrons from an activated emission surface within a specific, non-point-like extent with different starting positions, the emitted electrons regularly have a spatial distribution perpendicular to the axis of rotation, which results in the emitted electrons propagating on different paths. The differences in path length are mainly due to different starting positions of the respective electrons at the electron emitter or the spatial distribution. The propagation in the direction of the anode is carried out in particular by the acceleration unit, which provides in particular the high voltage between the cathode and the anode. In this context, deflection of several electrons can mean in particular a shift while maintaining the relative distances to each other and/or focusing and/or defocusing. In the case of focusing or defocusing, at least one distance between the electrons is changed by the deflection of several electrons, in particular is reduced in size in the case of focusing and in particular increased in size in the case of defocusing.

Due to the fanning out and/or deflection in the radial direction, the propagation of the emitted electrons typically takes place on a curved trajectory. The different paths of the emitted electrons are usually curved according to the curved trajectory. It follows from the curvature of the trajectory that the electrons can travel different path lengths along the respective paths until the electrons in the focal spot interact with the anode. The differences in path length along the different paths of the electrons resulting from the curvature of the trajectory are advantageously taken into account by the design of the location-dependent forces of the inhomogeneous field. In particular, the inhomogeneous field can be designed in such a way that the electrons are exposed to different location-dependent forces as a function of their paths.

It is conceivable that the inhomogeneous field is generated by the deflection unit as a function of an amount of high voltage between the cathode and the anode. In particular, the inhomogeneous field can be generated in such a way that a spatial cathode-side distribution of the electrons differs from a spatial anode-side distribution of the electrons. Cathode-side or anode-side means in particular after electron emission has taken place at the cathode or before the electrons strike the anode. The difference in spatial distribution between cathode and anode can lie in a different extent, especially perpendicular to the axis of rotation, preferably in a different width and/or different length.

One embodiment provides that the deflection unit surrounds the rotary piston in a plane perpendicular to the axis of rotation less than 360°, in particular less than 180°. In this case, the deflection unit does not completely surround the rotary piston in the circumferential direction, especially not for the most part. This embodiment therefore offers the advantage of the smaller space required for the deflection unit.

One embodiment provides that the inhomogeneous field is a magnetic field and that the deflection unit in particular has a coil with a magnetic core. In principle, it is conceivable that the deflection unit has a coil without a magnetic core. Alternatively, the deflection unit can include in particular only a permanent magnet. In particular, the deflection unit generates an inhomogeneous magnetic field via the coil with the magnetic core. In particular, the coil is energized and/or has multiple windings. The multiple windings can be distributed over a single winding package or multiple winding packages. The magnetic field generated by the coil with the magnetic core is static, in particular during the emission period. This embodiment is particularly advantageous because the inhomogeneous magnetic field is particularly suitable for taking into account the path length differences of the electrons. The magnetic core typically features a soft magnetic material and/or ferrite or is a permanent magnet. When the coil is combined with the magnetic core, the inhomogeneous field is generated in particular by the coil and the magnetic core together. If the magnetic core is a permanent magnet in this case, a coil current of the coil may advantageously be reduced, as the permanent magnet can compensate for the lower magnetic field of the coil. The magnetic core advantageously lowers the coil current strength required to reach the magnetic field. Alternatively or in addition, the magnetic core can influence the field gradient of the inhomogeneous field. This can influence the deflection in length and/or width in particular. Ideally, higher torques of the magnetic field can be minimized via the magnetic core. In purely physical terms, a magnetic field in the direction of the (instantaneous) velocity of the electrons typically has no effect. Since the electrons essentially fly along the axis of rotation, the magnetic field in a plane perpendicular to the axis of rotation is inhomogeneous.

It is conceivable that the coil comprises several packages with windings, wherein the several winding packages are fastened to sections of the magnetic core that are angled with respect to each other. In other words, in this embodiment, a central axis of a first winding package is at an angle not equal to 180° to a central axis of a second winding package and thus both are not on the same line. In particular, the number of winding packages can be two or three. The winding packages and the sections of the magnetic core can be arranged and formed symmetrically with respect to each other.

In particular, the magnetic core may have a curved shape. In particular, the magnetic core is not rod-shaped. The curved shape may in particular be a C shape. The ends of the magnetic core can enclose a non-zero angle. In particular, the angle can be equal to or less than 180°. In particular, the angle can be between 90° and 180°

Alternatively or in addition, at least one end of the magnetic core or both ends of the magnetic core can be beveled. In this respect, the bevel refers to a direction of curvature of the magnetic core. In particular, the magnetic core is not beveled if the closing surface of the magnetic core forming the end is perpendicular to the direction of curvature of the magnetic core. A bevel is therefore present in particular if the closing surface of the magnetic core forming the end is at an angle not equal to 90° to the direction of curvature.

The curved shape and/or the beveled ends mean in particular that the magnetic core is advantageously designed in such a way that the proportion of parallel magnetic field lines outside the magnetic core is reduced. This advantageously generates the inhomogeneous field.

One embodiment provides that the magnetic core is aligned in such a way that the ends of the magnetic core are perpendicular to the axis of rotation in the same plane and are aligned equidistant to the axis of rotation. In particular, the ends of the magnetic core are at the same height relative to the axis of rotation. In particular, the equidistant alignment enables a symmetrical alignment of the magnetic core around the axis of rotation.

One embodiment provides that the magnetic core is aligned in such a way that a plane perpendicular to the axis of rotation, in which the ends of the magnetic core lie, intersect the axis of rotation between the cathode and the anode. This embodiment is particularly advantageous because the deflection unit is arranged comparatively close to the electrons.

One embodiment provides that the magnetic core is aligned in such a way that a central axis of the windings of the coil lies in the plane perpendicular to the axis of rotation in which the ends of the magnetic core lie. In this case, the ends of the magnetic core and the central axis of the windings are in particular preferably at the same height relative to the axis of rotation.

FIG. 1 shows an electron emitter 10 in a first embodiment. The electron emitter 10 is suitable for a rotary piston X-ray tube 30. The electron emitter 10 has a segmented emitter surface 11. The segmented emitter surface 11 has at least two emitter elements 12.E, 12.1, 12.2 that can be activated independently of each other and is set up to activate at least one subset of the segments of the segmented emitter surface 11 as an activated emission surface 11.A for the emission of electrons from the activated emission surface 11.A.

At least one emitter element 12.1, 12.2 of the at least two emitter elements 12.E, 12.1, 12.2 is embodied for the thermionic emission of electrons. The at least two emitter elements 12.E, 12.1, 12.2 are arranged so close to each other that a distance A between the respective emitter surfaces is minimal.

The at least two emitter elements 12.E, 12.1, 12.2 are arranged in such a way that the segmented emitter surface 11 in the emitter plane is embodied as axially symmetrical and in this exemplary embodiment is essentially rotationally symmetrical. With regard to the exemplary embodiment shown in FIG. 1, the axis of symmetry corresponds to a horizontal axis through a center of the electron emitter 10 and the rotational symmetry also refers to the center point, which is only interrupted by the feeds 13.

In this first exemplary embodiment, the segmented emitter surface 11 consists of the two emitter elements 12.1, 12.2. The first emitter element 12.1 is embodied in a ring shape with a central opening 12.Z. The second emitter element 12.2 is located in the central opening 12.Z within the first emitter element 12.1. The shape of the central opening 12.Z is predetermined by the ring shape the first emitter element 12.1.

The first emitter element 12.1 is a spiral emitter. The second emitter element 12.2 can likewise be embodied as a thermionic emitter element or as a field effect emitter element.

Figure 2:
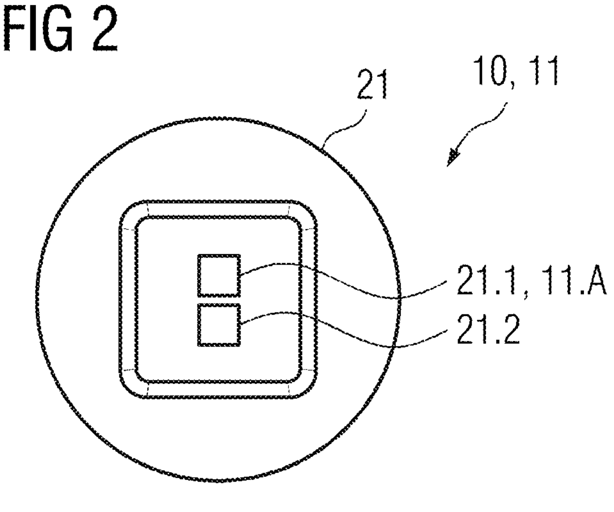
FIG. 2 shows an electron emitter in a second embodiment in a first operating state.

FIG. 2 shows an electron emitter 10 in a second embodiment in a first operating state. The second embodiment differs from the first embodiment in particular in the embodiment of the emitter elements 12.E, 12.1, 12.2.

The segmented emitter surface 11 consists of the two emitter elements 12.1, 12.2, is embodied axially symmetrical and rectangular with respect to two spatial axes that are perpendicular to each other. The segmented emitter surface 11 is higher than it is wide, in particular not square. The emitter elements 12.1, 12.2 are inserted into a round cathode head 21.

The first operating state of the electron emitter 10 means that only one of the two emitter elements 12.1, 12.2 is active and comprises the activated emission surface 11.A.

Figure 3:
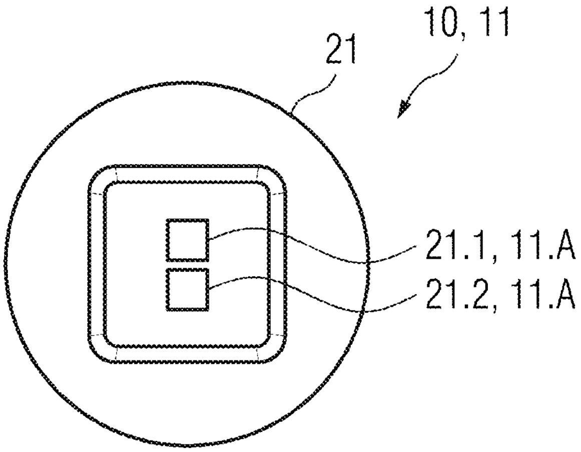
FIG. 3 shows the electron emitter of the second embodiment in a second operating state.

FIG. 3 shows the electron emitter 10 of the second embodiment in a second operating state. In the second operating state, both emitter elements 12.1, 12.2 are active and form the activated emission surface 11.A.

Figure 4:
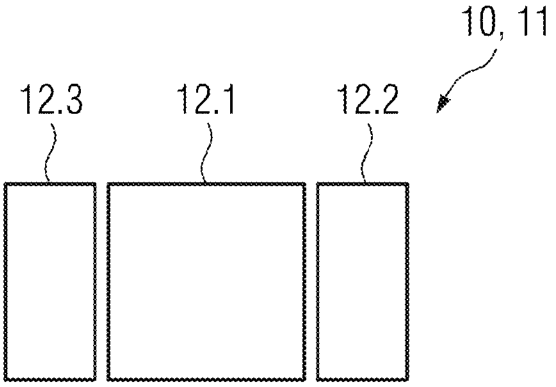
FIG. 4 shows an electron emitter in a third embodiment.

FIG. 4 shows an electron emitter 10 in a third embodiment.

The segmented emitter surface 11 consists of three emitter elements 12.1, 12.2, 12.3 arranged next to each other on a straight line and is higher than it is wide. An emitter surface of one of the emitter elements 12.1 is larger than the emitter surfaces of the other two emitter elements 12.2, 12.3 combined. For example, the additional activation of the other two emitter elements 12.2, 12.3 can increase a focal spot generated by the activated emission surface of the one electron emitter 12. The segmented emitter surface 11 is embodied as axially symmetrical with respect to two spatial axes that are perpendicular to each other and in this exemplary embodiment rectangular.

Figure 5:
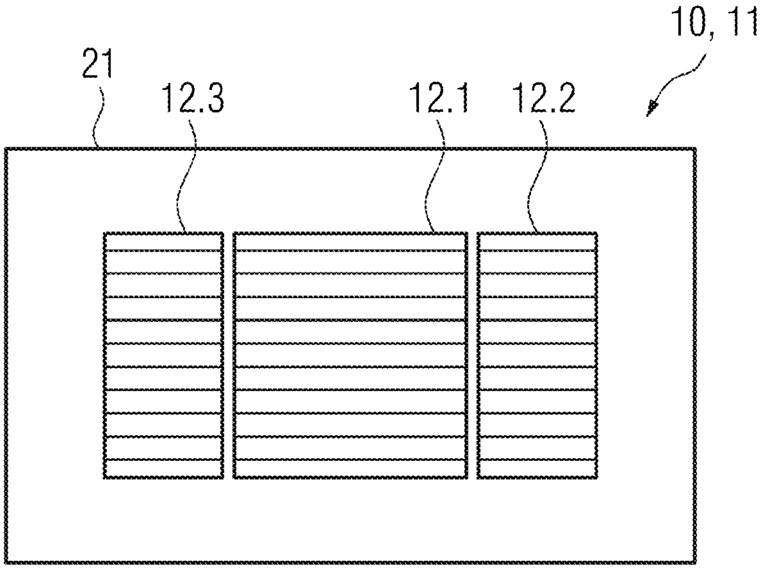
FIG. 5 shows a variant of the electron emitter of the third embodiment.

FIG. 5 shows a variant of the electron emitter 10 of the third embodiment. Here, each emitter element 12.1, 12.2, 12.3 is a spiral emitter.

Figure 6:
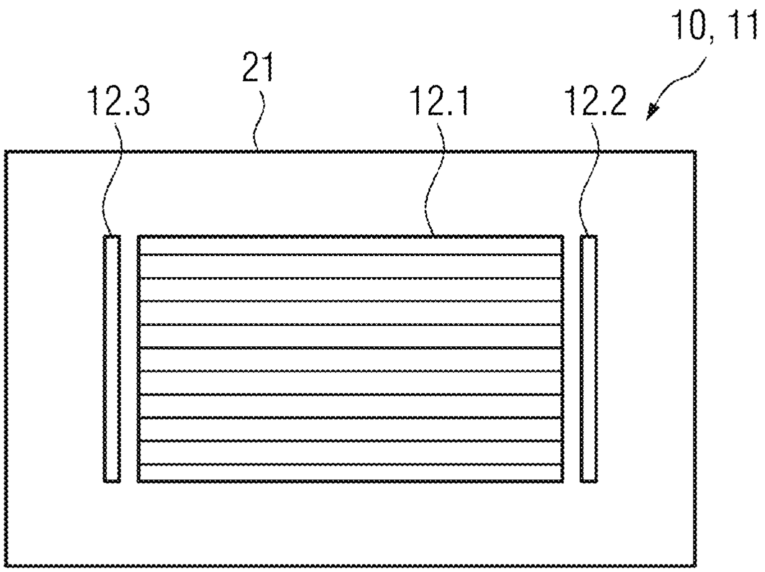
FIG. 6 shows a further variant of the electron emitter of the third embodiment.

FIG. 6 shows a further variant of the electron emitter 10 of the third embodiment. Here the central emitter element 12.1 can be a spiral emitter and the emitter elements adjacent to the central emitter element 12.1 can be non-spiral wire emitters.

Figure 7:
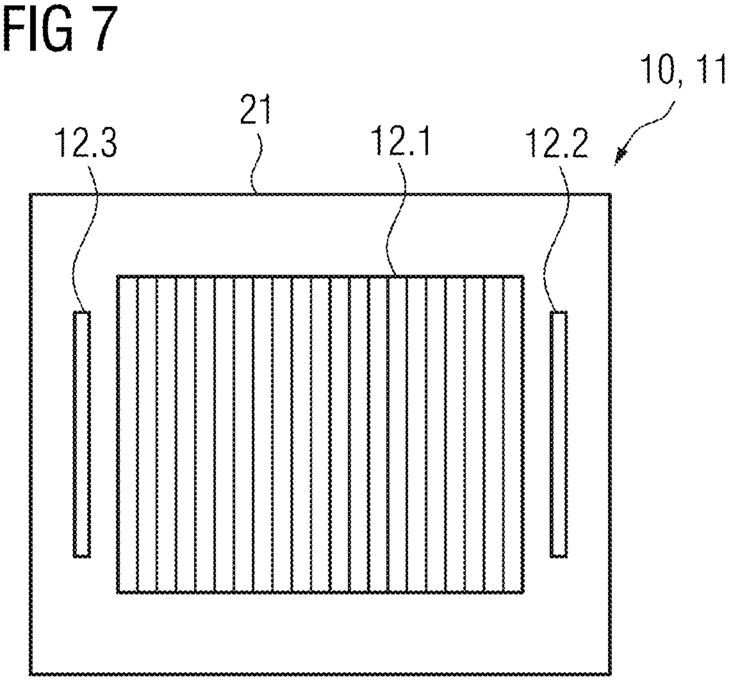
FIG. 7 shows another variant of the electron emitter of the third embodiment.

FIG. 7 shows another variant of the electron emitter 10 of the third embodiment. The only difference compared with the exemplary embodiment shown in FIG. 6 is that each two adjacent emitter elements 12.1, 12.2, 12.3 are oriented toward one another such that the emitter length directions are at right angles to one another.

Figure 8:
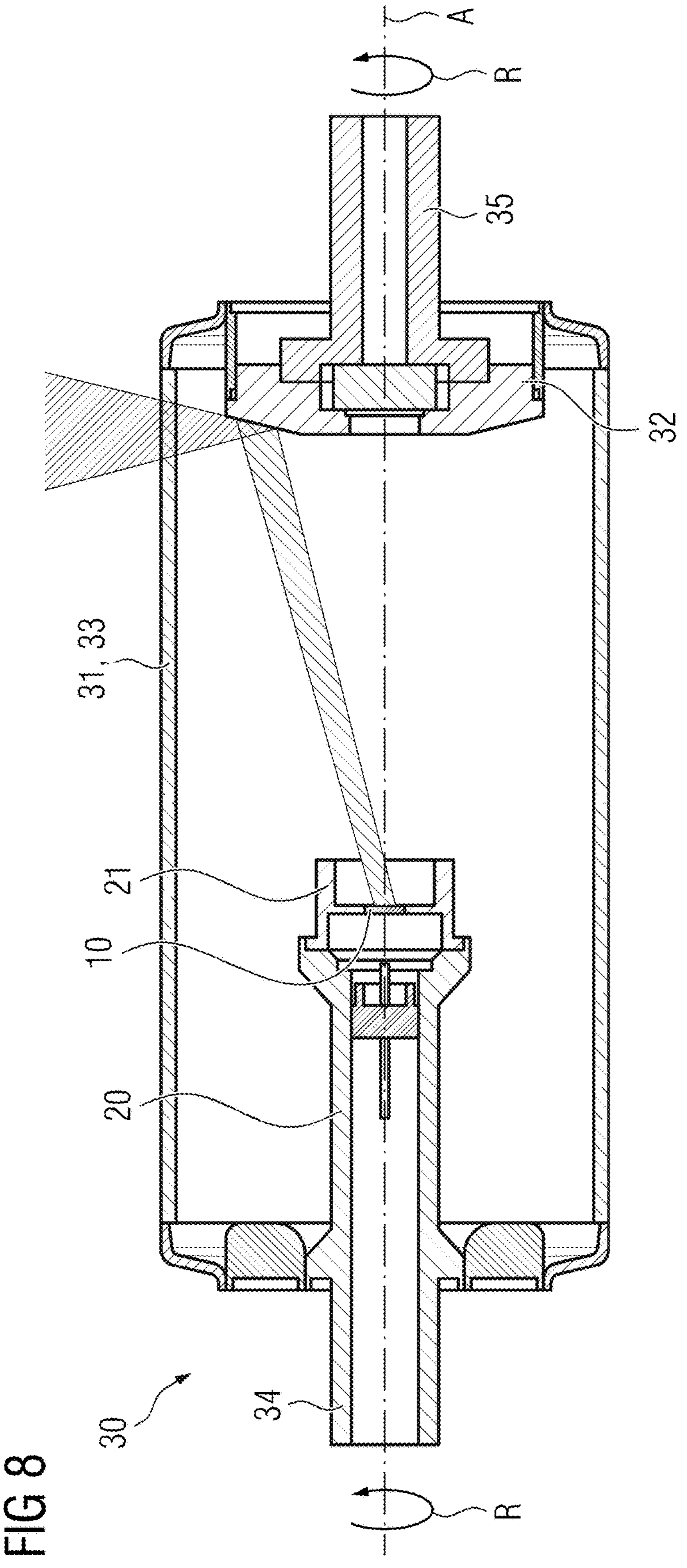
FIG. 8 shows a rotary piston X-ray tube according to one or more example embodiments.

FIG. 8 shows a rotary piston X-ray tube 30 in a longitudinal section along the axis of rotation A.

The rotary piston X-ray tube 30 has a cathode 20, an evacuated rotary piston 31 that can be stored around an axis of rotation A with a rotational frequency relative to a fixed bearing part (not shown in FIG. 8), and an anode 32. The cathode 30 and the anode 32 are connected to the rotary piston 31 in a torque-proof manner. The cathode 20 has a cathode head 21 and an electron emitter 10, which is inserted into the cathode head 21 in a torque-proof manner. The rotary piston 31 consists of a glass in a section 33 between the anode 32 and the cathode 20.

Furthermore, it is shown in FIG. 8 that the rotary piston 31 is cylindrical. A first end face of the cylindrical rotary piston 31 is embodied to accommodate a cathode-side bearing part 34. The cathode 20 is fastened to the cathode-side bearing part 34. A second end face of the cylindrical rotary piston 31 is embodied to receive an anode-side bearing part 35. The anode 32 is fastened to the anode-side bearing part 35. The cathode-side bearing part 34 and the anode-side bearing part 35 are embodied for the rotation of the rotary piston 31 relative to the fixed bearing part not shown in FIG. 8 around the axis of rotation A in the direction of rotation R or against the direction of rotation R. The cathode-side bearing part 34 and the anode-side bearing part 35 each have a shaft aligned with the axis of rotation A. For example, the shaft rotates in the direction of rotation R or in the opposite direction of rotation R and the rest of the rotary piston X-ray tube 30 rotates with the shaft. The rotary piston 31 could be rotatable around the axis of rotation A via a ball bearing (not shown).

In this version, the entire lateral surface of the rotary piston 31 consists of glass. The rotary piston X-ray tube 30 is a bipolar high-voltage tube, wherein a negative high-voltage potential prevails at the cathode 20 and a positive high-voltage potential prevails at the anode 32.

The diameter of the rotary piston 31 perpendicular to the axis of rotation A is less than 100 mm in this exemplary embodiment and is 85 mm. A length of the rotary piston 31 along the axis of rotation A is less than 200 mm and is 156 mm. Such a length is suitable for the glass bulb 30 to isolate an acceleration voltage of up to 125 kV between the cathode 20 and the anode 32. For example, the negative high voltage potential can be −62.5 kV and the positive high voltage potential can be 62.5 kV. For example, the distance between the cathode 20 and the anode 32 is 90 mm, wherein the anode 32 has an anode angle of 14° in particular.

Figure 9:
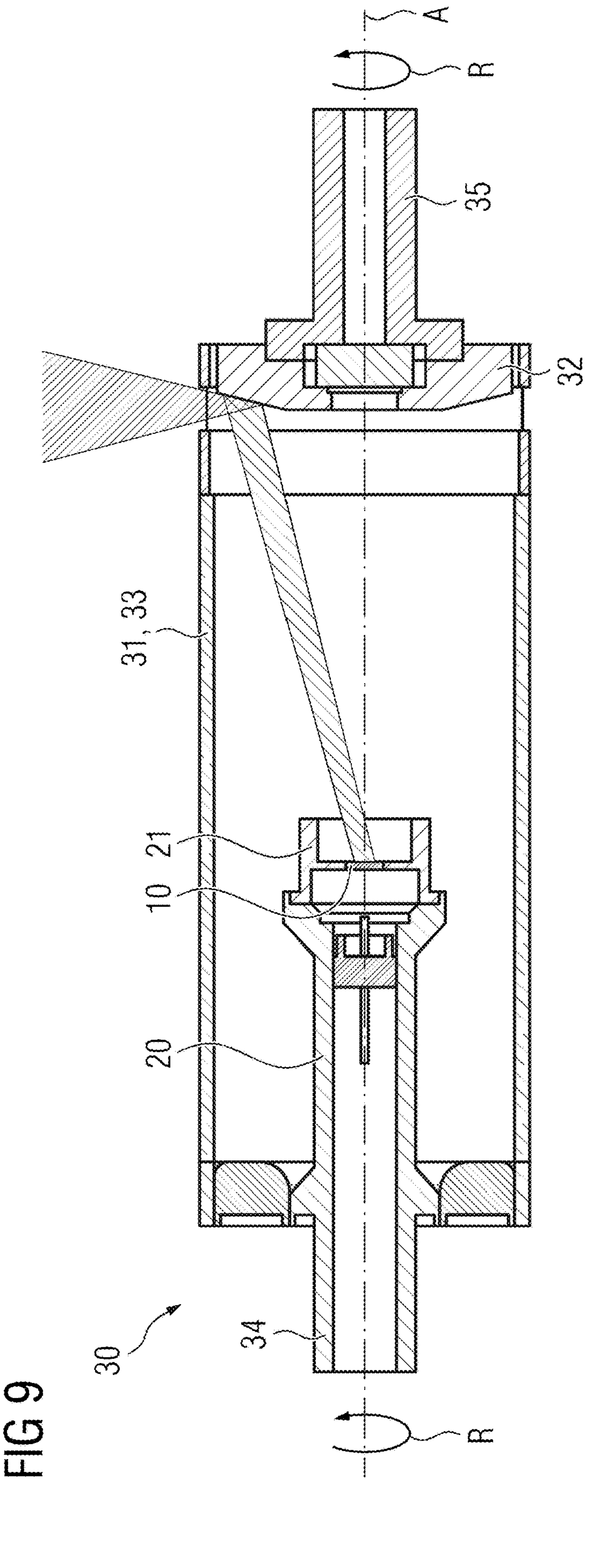
FIG. 9 shows a variant of the inventive rotary piston x-ray tube.

FIG. 9 shows a variant of the rotary piston x-ray tube 30 in a longitudinal section along the axis of rotation A. In this variant, the anode angle of the anode 32 amounts to 16° and the diameter of the rotary piston 31 perpendicular to the axis of rotation A 65 mm.

Figure 10:
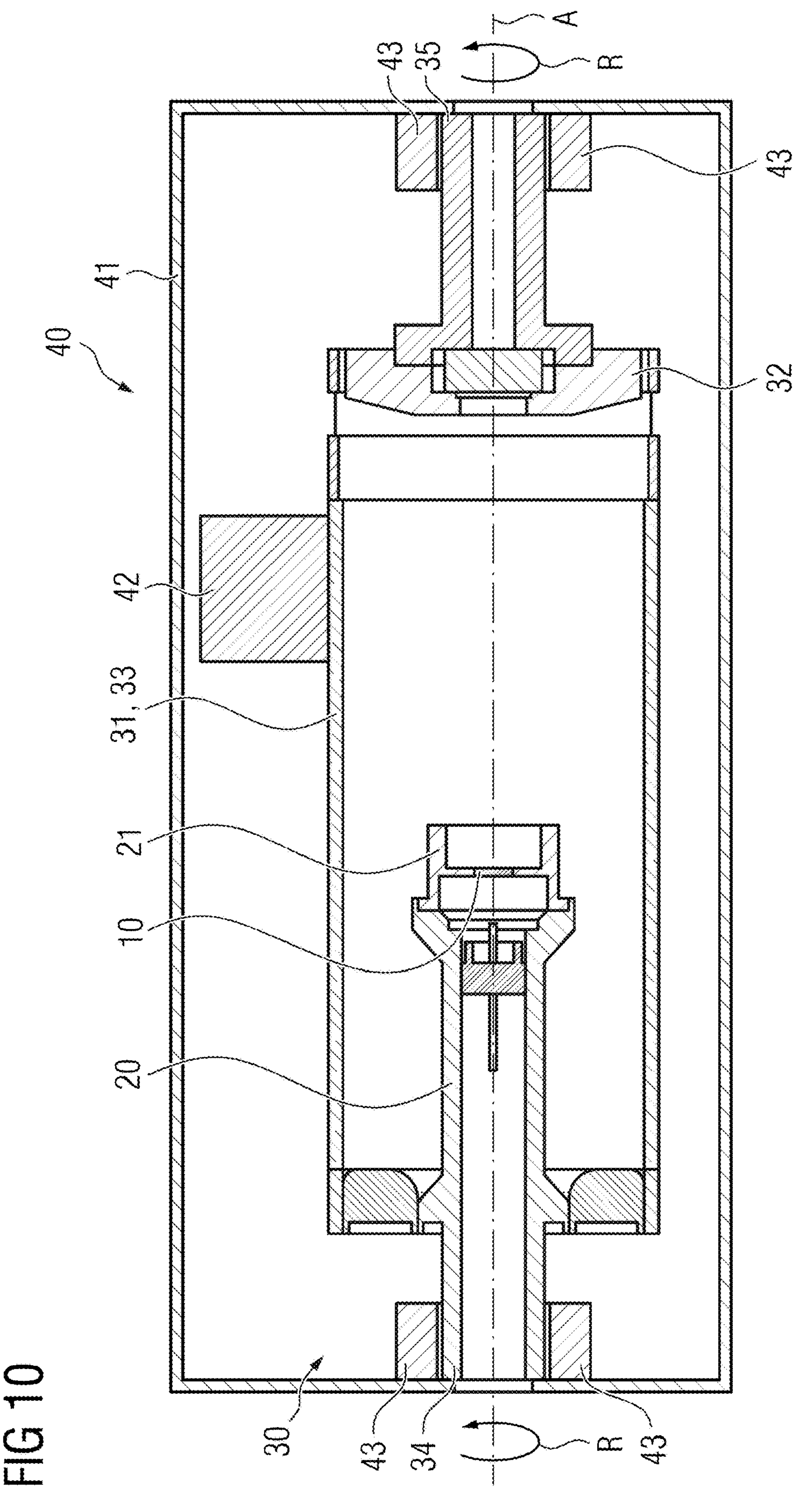
FIG. 10 shows a rotary piston X-ray emitter according to one or more example embodiments.

FIG. 10 shows a longitudinal section through a rotary piston X-ray emitter 40.

The rotary piston X-ray tube 40 has a housing 41, a rotary piston X-ray tube 30 and a deflection unit 42. The rotary piston X-ray tube 30 is mounted rotatably within the housing 41 around an axis of rotation A with a rotational frequency relative to the housing 41. The rotary piston X-ray tube 30 has a cathode 20, a rotary piston 31 and an anode 32. The anode 32 is connected to the rotary piston 31 in a torque-proof manner. The cathode 20 has cathode head 21 and an electron emitter 10 inserted into the cathode head 21 for the emission of electrons and is arranged within the rotary piston 31 on the axis of rotation A.

The deflection unit 42 is set up to generate an inhomogeneous field between the cathode 20 and the anode 32 within rotary piston 31. The inhomogeneous field influences the emitted electrons on their different paths in the direction of the anode 32 and is designed in such a way that differences in the path length of the emitted electrons along the different paths within the inhomogeneous field are taken into account. When the deflection unit 42 has a coil with a magnetic core, the deflection unit 42 is designed in FIG. 10 by way of example such that a plane perpendicular to the axis of rotation A, in which the ends of the magnetic core lie, intersects the axis of rotation A between the cathode 20 and the anode 31.

The rotary piston X-ray emitter 40 also has a fixed bearing part 43, which is connected to the housing 41 in a torque-proof manner. The fixed bearing part 43 interacts in particular with the cathode-side bearing part 34 and the anode-side bearing part 35 to enable the rotation of the rotary piston X-ray tube 30 relative to the housing 41.

Figure 11:
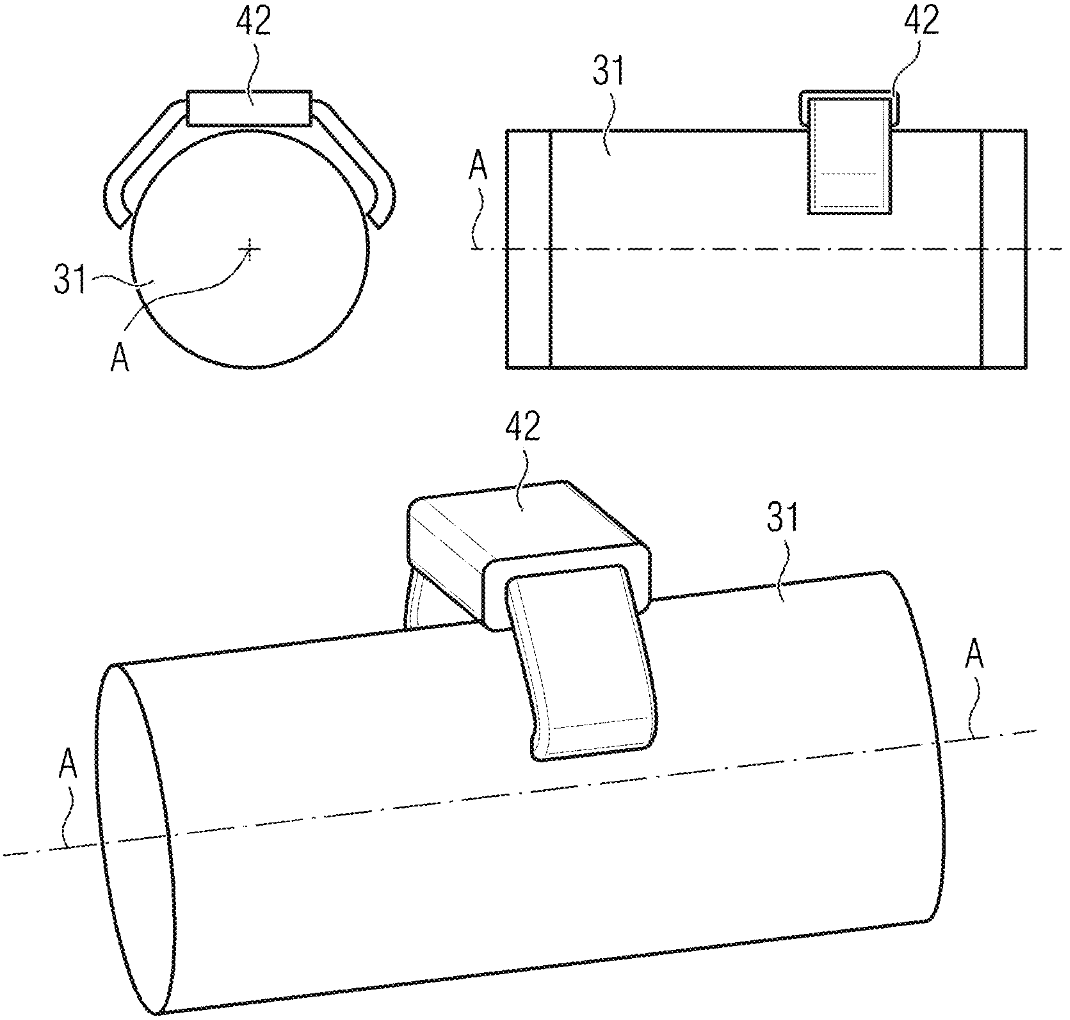
FIG. 11 shows a variant of the deflection unit.

FIG. 11 shows three views of a variant of the deflection unit 42. The deflection unit 42 surrounds the rotary piston 31 in a plane perpendicular to the axis of rotation A less than 360°, in particular less than 180°.

The deflection unit 42 has a coil with a magnetic core. The magnetic core is aligned in such a way that the ends of the magnetic core in the same plane are perpendicular to the axis of rotation A and are aligned equidistant to the axis of rotation A. The magnetic core is further aligned in such a way that a central axis of the windings of the coil lies in the plane perpendicular to the axis of rotation A in which the ends of the magnetic core lie. The magnetic core is further designed so that the portion of magnetic field lines running in parallel is reduced outside of the magnetic core.

In the upper line, the two views show the deflection unit 42 together with the rotary piston 31 on the left in a frontal view and on the right in a side view. The bottom line shows a perspective view of the deflection unit 42.

Figure 12:
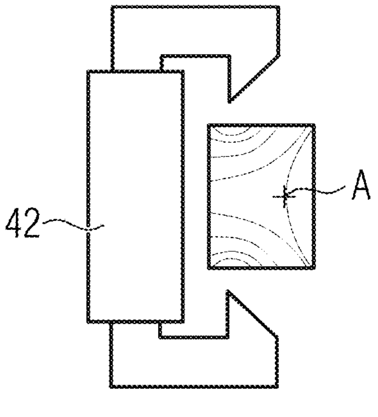
FIG. 12 shows a further variant of the deflection unit.

FIG. 12 shows a further variant of the deflection unit 42 in a detailed view. The inhomogeneous field is a magnetic field. The deflection unit 42 has a coil with a magnetic core. The magnetic core is curved and at least one end, in this embodiment both ends, of the magnetic core are beveled.

Figure 13:
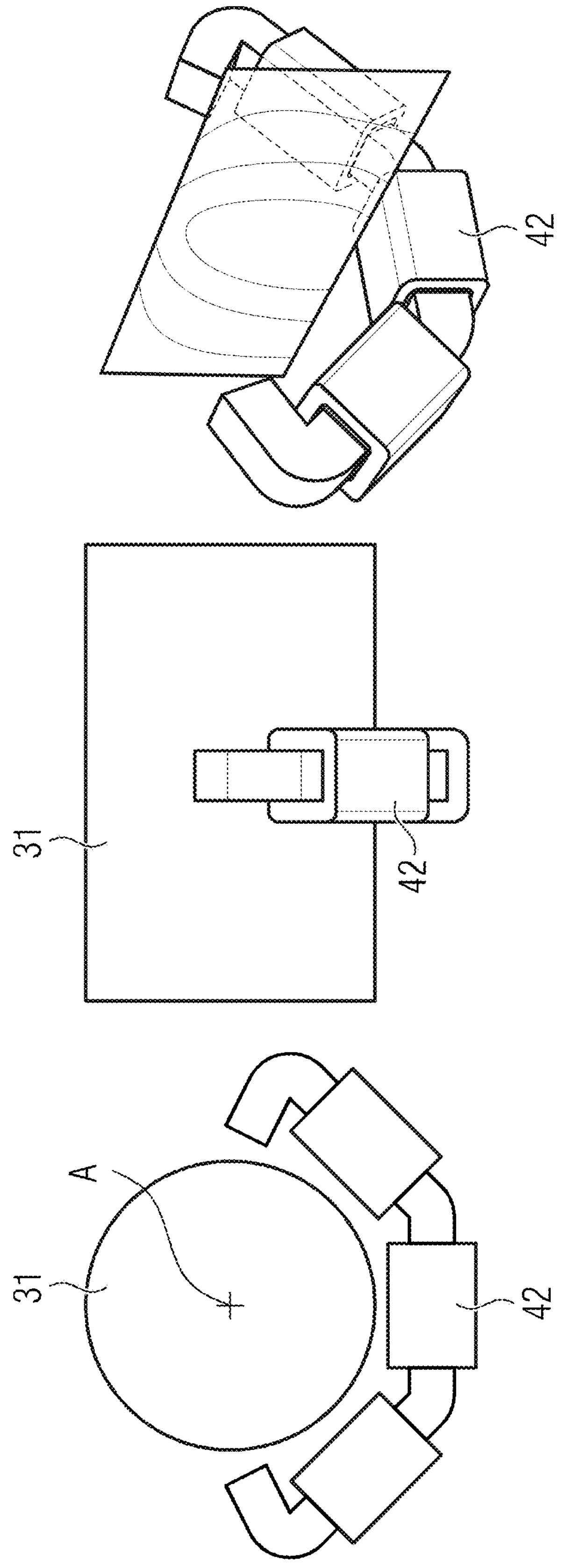
FIG. 13 shows another variant of the deflection unit.

FIG. 13 shows three views (front, side, perspective from left to right) of another variant of the deflection unit 42. The deflection unit 42 has a coil with a magnetic core. The coil comprises several packages with windings. The number of winding packets are fastened on sections of the magnetic core which are angled to one another.

Figure 14:
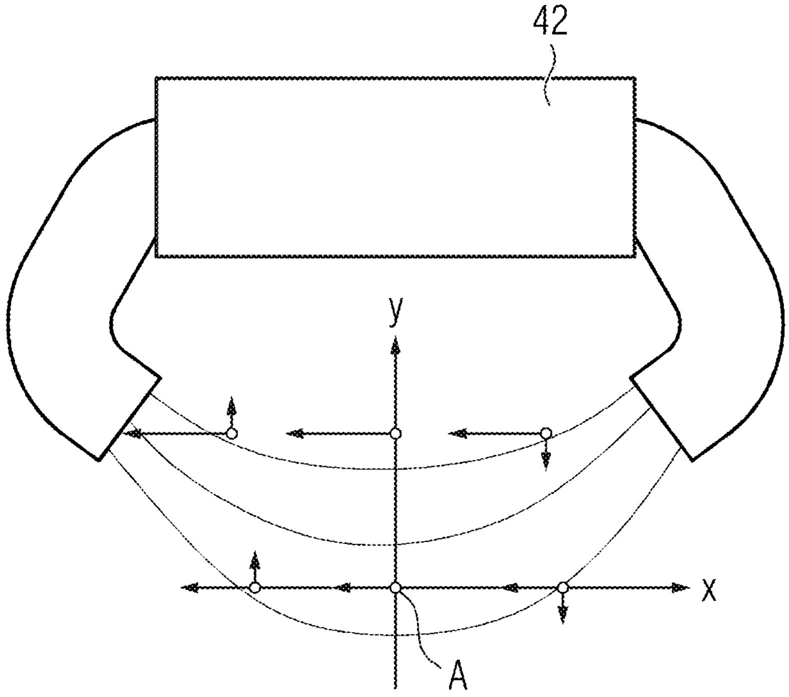
FIG. 14 shows an inhomogeneous field.

FIG. 14 shows an inhomogeneous magnetic field. The deflection unit 42 has a coil with a magnetic core. The magnetic field components are schematically drawn, which results in the drawn course of the field lines shown along the solid lines. An inhomogeneous magnetic field configured in this way is particularly advantageous because Bx has a gradient in the negative y-direction and By has the sign of the x-axis and a gradient in the y-direction.

Incidentally, in FIG. 14 the position of the axis of rotation A is shown at the level of the x-axis purely by way of example. A shift of the axis of rotation A up or down along the y-axis is easily conceivable.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus versus "directly between," "adjacent," "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units a according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory magnetic devices); storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the invention has been illustrated and described in detail by the preferred exemplary embodiments, the invention is nevertheless not limited by the disclosed examples and other variations can be deduced therefrom by the person skilled in the art without leaving the scope of the invention.

The invention claimed is:

1. An electron emitter for a rotary piston X-ray tube, comprising:

a segmented emitter surface including at least two emitter elements that can be activated independently of each other, the segmented emitter surface being configured to activate at least a subset of segments of the segmented emitter surface as an activated emission surface for emitting electrons from the activated emission surface, the at least two emitter elements being arranged such that the segmented emitter surface is axially symmetrical in an emitter surface plane, at least one emitter element of the at least two emitter elements is configured for thermionic emission of electrons, and the at least two emitter elements are arranged such that a distance between the respective emitter surfaces is minimal.

2. The electron emitter of claim 1, wherein the segmented emitter surface includes the at least two emitter elements and is rotationally symmetrical, a first emitter element of the at least two emitter elements is ring-shaped with a central opening, and a second emitter element of the at least two emitter elements is in the central opening within the first emitter element.

3. The electron emitter of claim 2, wherein the first emitter element is a spiral emitter.

4. The electron emitter of claim 1, wherein the segmented emitter surface includes the at least two emitter elements, is axially symmetrical and rectangular with respect to two spatial axes that are perpendicular to each other, and a height of the segmented emitter surface is greater than a width of the segmented emitter surface.

5. The electron emitter of claim 4, wherein a first emitter element of the at least two emitter elements is a spiral emitter and a second emitter element of the at least two emitter elements is a spiral emitter.

6. The electron emitter of claim 1, wherein
- the segmented emitter surface consists of three emitter elements next to each other on a straight line,
- a height of the segmented emitter surface is greater than a width of the segmented emitter surface, and
- an emitter surface of one of the three emitter elements is larger than the emitter surfaces of the other two emitter elements combined.

7. The electron emitter of claim 6, wherein each emitter element of the three emitter elements is a spiral emitter.

8. The electron emitter of claim 6, wherein a central emitter element of the three emitter elements is a spiral emitter and the emitter elements adjacent to the central emitter element are non-spiral-shaped wire emitters.

9. The electron emitter of claim 7, wherein each two adjacent emitter elements are oriented toward one another such that emitter length directions of the two adjacent emitter elements are perpendicular to one another.

10. A rotary piston X-ray tube comprising:
- a cathode including a cathode head and the electron emitter of claim 1, the electron emitter inserted into the cathode head;
- an evacuated rotary piston mountable around an axis of rotation with one rotational frequency relative to a fixed bearing part; and
- an anode, wherein the cathode and the anode inside the rotary piston are connected to the rotary piston.

11. The rotary piston X-ray tube of claim 10, wherein the rotary piston includes a glass at least in a section between the cathode and the anode.

12. A rotary piston X-ray emitter comprising:
- a housing;
- the rotary piston X-ray tube of claim 10; and
- the fixed bearing part, wherein the fixed bearing part is connected to the housing and the rotary piston x-ray tube is mounted within the housing so as to be rotatable via the fixed bearing part relative to the housing.

13. The rotary piston X-ray emitter of claim 12, wherein the rotary piston x-ray emitter includes a deflection unit configured to generate an inhomogeneous field between the cathode and the anode within the rotary piston, and the inhomogeneous field influences the emitted electrons on their different paths in a direction of the anode and is designed such that wavelength differences in the emitted electrons are taken into account along the different paths within the inhomogeneous field.

14. The rotary piston X-ray emitter of claim 13, wherein the deflection unit surrounds the rotary piston in a plane perpendicular to an axis of rotation less than 360°.

15. The rotary piston X-ray emitter of claim 13, wherein the inhomogeneous field is a magnetic field and wherein the deflection unit has a coil with a curved magnetic core.

16. The rotary piston X-ray tube of claim 10, wherein the electron emitter is inserted into the cathode head in a torque-proof manner.

17. The rotary piston X-ray tube of claim 16, wherein the cathode and the anode inside the rotary piston are connected to the rotary piston in a torque-proof manner.

18. The rotary piston X-ray emitter of claim 12, wherein the fixed bearing part is connected to the housing in a torque-proof manner.

* * * * *